United States Patent [19]

Wong et al.

[11] Patent Number: 5,913,203
[45] Date of Patent: Jun. 15, 1999

[54] SYSTEM AND METHOD FOR PSEUDO CASH TRANSACTIONS

[75] Inventors: Jacob Y. Wong, Santa Barbara; Roy L. Anderson, Glendale, both of Calif.

[73] Assignee: Jaesent Inc., Goleta, Calif.

[21] Appl. No.: 08/720,785

[22] Filed: Oct. 3, 1996

[51] Int. Cl.$^6$ ................................................ G06F 17/60
[52] U.S. Cl. .............................. 705/39; 705/26; 705/43
[58] Field of Search ................................... 705/6, 39, 43, 705/44, 26; 380/24, 25, 4; 364/479.02

[56] References Cited

U.S. PATENT DOCUMENTS

| | | | |
|---|---|---|---|
| 3,665,161 | 5/1972 | Oberhart | 235/379 |
| 3,845,277 | 10/1974 | Voss et al. | 235/379 |
| 4,016,405 | 4/1977 | McCune et al. | 235/380 |
| 4,234,932 | 11/1980 | Gorgens | 235/379 |
| 4,314,352 | 2/1982 | Fought | 235/379 |
| 4,390,968 | 6/1983 | Hennessy et al. | 380/24 |
| 4,438,326 | 3/1984 | Uchida | 705/43 |
| 4,650,978 | 3/1987 | Hudson et al. | 235/380 |
| 4,755,940 | 7/1988 | Brachtl et al. | 705/44 |
| 5,220,501 | 6/1993 | Lawlor et al. | 380/24 |
| 5,371,797 | 12/1994 | Bocinsky, Jr. | 380/24 |
| 5,373,558 | 12/1994 | Chaum | 380/23 |
| 5,434,919 | 7/1995 | Chaum | 380/30 |
| 5,438,186 | 8/1995 | Nair et al. | 235/449 |
| 5,440,108 | 8/1995 | Trean et al. | 235/381 |
| 5,444,616 | 8/1995 | Nair et al. | 705/17 |
| 5,448,047 | 9/1995 | Nair et al. | 705/35 |
| 5,455,407 | 10/1995 | Rosen | 380/24 |
| 5,850,442 | 12/1998 | Muftic | 380/21 |

OTHER PUBLICATIONS

International Search Report re PCT/US97/15701.
Article from Scientific American entitled "Achieving Electronic Privacy" by David Chaum, Aug. 1992; pp. 96–101.
Article entitled "Security Without Identification: Transaction Systems to Make Big Brother Obsolete" by David Chaum, Communications of the ACM; vol. 28 No. 10; Oct. 1985; pp. 1030–1044.
Article entitled "Online Cash Checks" by David Chaum, Advances in Cryptology EUROCRYPT '89; J.J. Quisquarter & J. Vanderwalle (Eds.), Springer–Verlag; pp. 288–293.

*Primary Examiner*—Allen R. MacDonald
*Assistant Examiner*—Romain Jeanty
*Attorney, Agent, or Firm*—Lyon & Lyon LLP

[57] ABSTRACT

Totally anonymous or effectively anonymous cash-like transactions are accomplished by using a pseudo cash data package converter for inserting a user key into a pseudo cash preliminary data packet through the use of a user insertion key to generate a pseudo cash unit with a fixed monetary value that can be used to purchase goods or services via the Internet. A pseudo cash repository facilitates the cash-like transactions and maintains a record of the pseudo cash units and their fixed monetary value. Depending upon the level of anonymity selected by a purchaser, the pseudo cash repository can either transmit pseudo cash preliminary data packets or pseudo cash units to a first entity. If the first entity loses an effectively anonymous pseudo cash preliminary data packet, it can be replaced by the pseudo cash repository without risk of loss.

71 Claims, 2 Drawing Sheets

SYSTEM AND METHOD FOR PSEUDO CASH TRANSACTIONS

FIELD OF THE INVENTION

The present invention is in the field of electronic money/Internet payment systems.

BACKGROUND OF THE INVENTION

When the idea of shopping on the Internet was first introduced a few years ago and made known to people using the Internet for reasons other than shopping, it was believed to be an instant retail business bonanza. From the standpoint of commerce and retail business, the Internet makes buying and selling of goods, information and services exceedingly simple and convenient. Suddenly the whole world is at one's disposal through the so-called "browsing" software designed for the Internet. A tremendous wealth of information, just about anything one wishes to know, is suddenly at one's finger tip through a few clicks of the mouse attached to one's PC. But that is only referring to the part of buying and selling something on the Internet and the mechanism of payment involved must also be rendered simple and convenient in order to take advantage of the overall situation. Thus the payment part of the transaction must also be devised just as simple and convenient as the buy-sell part. What we are aiming at here is an overall system that will take care of both the buy-sell and the subsequent payment parts as efficiently as possible for such transactions on the Internet.

Today shoppers purchasing goods or services on the Internet are required to give their credit card numbers, phone numbers and/or addresses over the Internet in order to complete their transactions. The problem is that they do not know who else might be able to retrieve this information without their consent. People are still enthusiastic about the idea but are much more reserved in believing its potential, all because of the issues of privacy and potential credit liability not being totally resolved in shopping on the Internet at the present time. However, no sooner than these issues were first identified, a number of entrepreneurs and companies went straight to work in the hope of solving these problems with the simplest of answers.

Not necessarily introduced in chronological order, a concept called "First Virtual" first asks a potential customer to fill out an application form providing standard personal information. First Virtual would then send a personal identification number (PIN) with an 800 number over the Internet to the customer's email. Then the customer is supposed to use the 800 number to give the customer's credit card information over the phone to First Virtual to establish or open no more than just an electronic charge account. Clearly this system or procedure to shop on the Internet is no less complicated than the home shopping network and is nowhere close to a simple and anonymous cash dispensing system that one would desire.

Another concept called "Cybercash" requires customers or buyers on the Internet to first open a special Cybercash bank account that contains money designated for spending on the Internet. A consumer issues instructions to purchase goods or services on the Internet and money for these items are transferred from the consumer's Cybercash bank account to that of the merchant's. Transactions are anonymous unless the seller specifically asks for the identity of the buyer. Again one can readily see that this concept, although rather secured from the money handling standpoint, is not totally anonymous. Furthermore, it is rather complicated involving a number of interactions between the buyer, the Cybercash bank and the seller. It is definitely incompatible with the simple elegance of doing shopping on the Internet, particularly with regards to speed and ultimate privacy.

Yet another concept called the "Netbill" requires a buyer on the Internet to first put money in a Netbill account and subsequent transactions made by the buyer are to be drawn off from the account sum or balance. Accounts of both buyers and sellers are maintained on a Netbill server, to keep transactions off the Internet and to maintain lower transaction costs. After a purchase is made, the transfer of funds will automatically take place at the server. Digital goods, e.g. programs, documents etc. are transferred to the buyer in encrypted form. When the Netbill account has cleared the transaction, a receipt containing the key to the encrypted goods is sent to the merchant, then forwarded to the consumer. The advantages of this concept clearly lie in the good security of fund transfer and in accountability. However, the transaction is complicated and could be time consuming. Furthermore, it is not totally anonymous.

A two-step process called "Millicent" had also been introduced. This two-step process uses fake money much like Geoffrey Bucks at Toys 'R' Us stores. A merchant creates its own electronic currency, or "scrip", that is sold to brokers. Brokers then sell the scrip to buyers. Sellers deal with just a handful of accounts, spreading transaction costs over a large volume of purchases. Millicent customers need to buy currency from only a few trusted brokers, not every vendor. Anyone can see the request for merchandise or services and the transfer of scrip over the Net as transactions take place. Clearly the principal advantage of this system is its potential efficiency and extremely low transaction costs. However, merchants can run off with the money and the system lacks privacy and auditability.

The best system to date, but by no means perfect or totally practical, is the so-called "Digicash" or "ecash". In theory this system turns a user's or buyer's hard drive on a PC into a purse. To use this system, one first establishes an account with a bank. To obtain digicash or ecash, the user creates a series of numbers that will represent a mixture of coins or money bills in various denominations according to the user's own wishes. This request for digicash is then sent to the bank, which deducts the total amount requested from the user's existing valid account. The bank then sends the user an equivalent amount of ecash as an encrypted email message containing a series of numbers. Each number corresponds to a specified amount of money.

Before the user can actually use these encrypted series of numbers from the bank to purchase goods or services on the Net, the user must first obtain a user name and a password from Digicash. Then the user has to download Digicash's ecash software to the user's PC. The final step is to create the user's own encryption key (in essence another password) and together with the user's password obtained earlier from Digicash, the user can then spend ecash on the Net.

The Digicash system has two excellent features that are essential to any such system trying to become the future standard of the electronic money/Internet payment industry. They are strong anonymity (not absolute) and cryptography. The shortcomings of this system, on the other hand, are quite plentiful. First of all, cryptography implementation for information transfer, if not very carefully thought out ahead of time, can be very expensive. Such is the case for the Digicash system.

Second, as implemented today, the Digicash system is very interaction intensive and rather loosely organized.

Requests by users to the bank and the bank's handling of their requests alone could be an awesome burden to the bank when the traffic builds up in a hurry. This is especially the case when there is no amount limits of any kind imposed on any ecash request. Thus a one dollar request must be handled in the same way as one that is for $1,000.

Third, even though the anonymity for any transaction is strong, it is by no means absolute. The reason is that the encrypted ecash that is passed on to a user originates from a bank who has the account information of the individual. In order that the bank subsequently honors this particular ecash from the merchants, it needs to reconcile with its initial issuance and that leads to the original account that requested it.

Finally, a user's ecash is stored as a series of numbers on the hard disk of his PC. But storing numbers on the hard disk is risky. If one has a disk crash, which is quite common nowadays in view of the complexities of modern day software, or if one's computer is stolen, one has lost his money. It likens in this case to losing one's wallet. Because of this, users are likely to acquire encoded electronic cash only shortly before they intend to spend it and acquire only as much as they think they will really need. This particular user behavior renders the overall system highly inefficient and ultimately causes transaction overload and increased dissatisfaction and higher operating costs.

It is clear from the above discussion of systems and/or procedures for electronic money/Internet payment existing and available today that a better system is desired and badly needed. Since personal privacy and credit liability will no doubt continue to be issues of great importance for the potential Internet users, commerce on the Internet simply cannot flourish without a cash dispensing system that would not only guarantee these features but also others that take advantage of the simplicity and convenience of buying and selling on the Net.

SUMMARY OF THE INVENTION

The present invention is generally directed to electronic money/Internet payment systems, and specifically relates to a procedure and method whereby customers and vendors can buy and sell merchandise and information on the Internet in a manner resembling various degrees of a real-life cash transactions, namely from a traceable transaction to an absolutely anonymous or private one, like using real cash. In particular, the present invention uses a pseudo cash data packet converter for inserting a user key into a pseudo cash preliminary data packet through the use of a user insertion key to generate a pseudo cash unit with a fixed monetary value.

In a first, separate aspect of the present invention, a pseudo cash unit is generated by a pseudo cash repository by use of the user key and the user insertion key of a first entity. The pseudo cash unit is assigned a fixed monetary value and the first entity exchanges the fixed monetary value for receipt of the pseudo cash preliminary data packet which was used to generate the pseudo cash unit. Once the pseudo cash unit is generated, an active record of the pseudo cash unit and the fixed monetary value assigned to the pseudo cash unit is generated and maintained by the pseudo cash repository until the record is deactivated. When the first entity wishes to spend the pseudo cash unit associated with the pseudo cash preliminary data packet received from the pseudo cash repository, the pseudo cash unit is generated by a pseudo cash data packet converter by inserting the first entity's user key into the pseudo cash preliminary data packet in accordance with an algorithm that uses the user insertion key of the first entity. Now the pseudo cash unit can be transmitted to a second entity who transmits the pseudo cash unit back to the pseudo cash repository. Once the pseudo cash repository verifies that an active record exists for the pseudo cash unit, the record is deactivated and the fixed monetary value of the pseudo cash unit is transferred from the pseudo cash repository to the second entity.

In another, separate aspect of the present invention, the pseudo cash preliminary data packet can be dispensed by any number of means, including mail, an automatic teller machine or even over an electronic communication medium.

In still another, separate aspect of the present invention, the user key and the user insertion key of the first entity are stored in a first entity account file of the pseudo cash repository associated with the first entity which is used to generate a pseudo cash unit for the first entity. As a result, a record associated with each pseudo cash unit is kept by the pseudo cash repository which can be used to confirm transactions between the first entity and a second entity, or to verify outstanding pseudo cash units created by the pseudo cash repository for the first entity. In accordance with this aspect of the present invention, if the first entity should lose or misplace a pseudo cash preliminary data packet, the pseudo cash repository could dispense the pseudo cash preliminary data packet to the first entity one or more additional times. Similarly, if there is a question as to where a particular pseudo cash unit was spent by the first entity, this information could be obtained by the first entity from the pseudo cash repository.

In yet another, separate aspect of the present invention, the first entity receives a pseudo cash unit generated by the pseudo cash repository in exchange for the fixed monetary value associated with the pseudo cash unit. The pseudo cash repository maintains an active record of the pseudo cash unit until the pseudo cash unit is exchanged for the fixed monetary value. Because the identity of the first entity cannot be determined from any record maintained by the pseudo cash repository, the transaction is an anonymous transaction similar to an anonymous cash transaction.

Accordingly, it is a primary object of the present invention to provide a novel cash dispensing system and procedure for use in conducting cash transactions on the Internet such as the purchases of goods, information and services between buyers and sellers.

DETAILED DESCRIPTION OF THE PREFERRED EMBODIMENT

Figure 1:
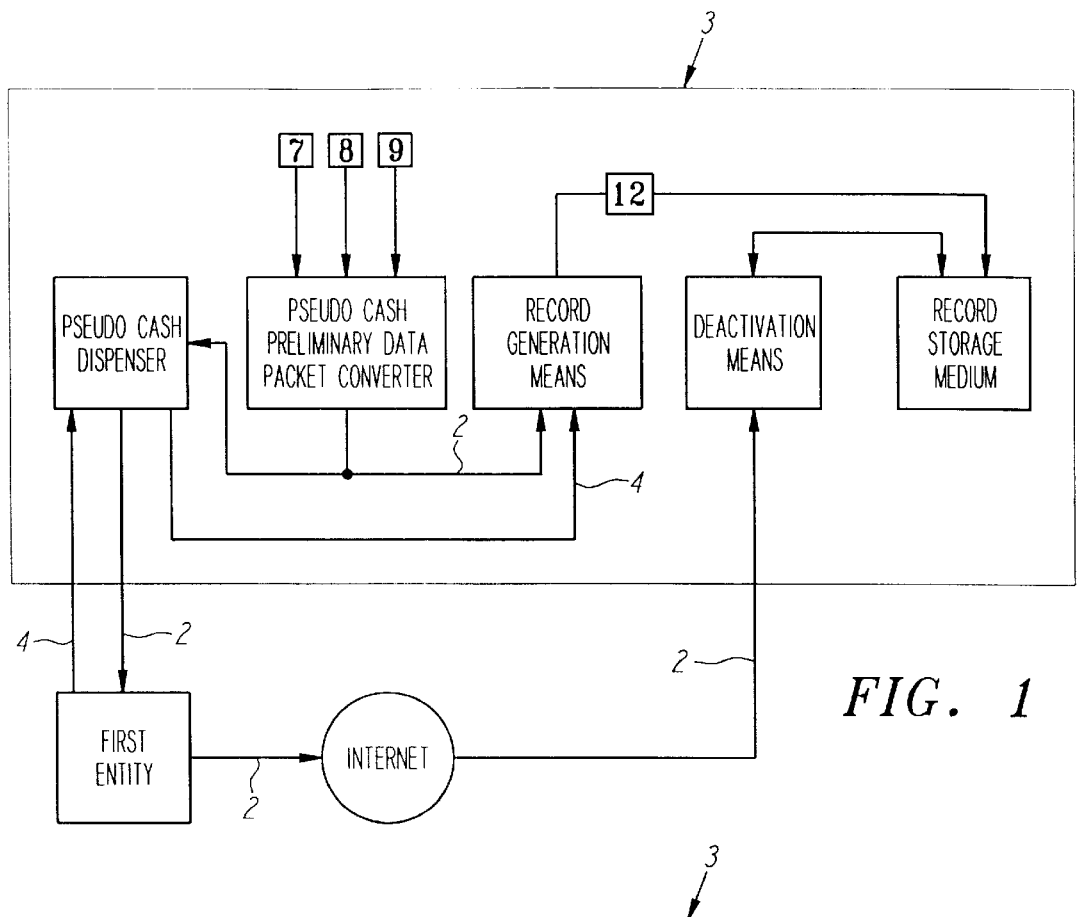
FIG. 1 is a schematic drawing depicting a system and method for providing totally anonymous pseudo cash transaction on the Internet.

In the preferred embodiment of the present invention, a system for providing pseudo cash transactions is provided which relies upon pseudo cash units generated by insertion of user keys into pseudo cash preliminary data packets in accordance with user insertion keys through the use of an algorithm. Although the system is designed for multiple transactions, for the sake of simplicity in its description, the system will be described in the singular, i.e., it will describe how a single sequence will work.

Initially, there must be a money source. This is described as a pseudo cash repository, but it does not need to be a single entity. In practice, it can be a single bank, or a single credit card company or a number of affiliated banks (a bank group) or a number of affiliated credit card companies (a card group) affiliated with one or more merchants and set up to do business with one or more money source customers or some other entity or entities that will perform such a function. The pseudo cash repository, in concept, is similar to an entity that issues traveler's checks (for a non-anonymous cash-like transaction) or a money order (for a potentially anonymous cash-like transaction).

There must also be at least one customer desirous of engaging in a pseudo cash transaction. This customer, which can be an individual person, a company or some other entity, is described as a first entity. It is envisioned that the first entity will use pseudo cash to transact business with another entity, described as a second entity, that has made arrangements with the pseudo cash repository to receive money for pseudo cash units it transfers to the pseudo cash repository. However, it is possible that the second entity is identical to the first entity when the first entity merely wishes to cash in a pseudo cash unit (this would be analogous to a person cashing a traveler's check or money order that the same person had earlier purchased).

There is no limit to how many customers and merchants a single bank, a single credit card company, one or more banks within a bank group or multiple bank groups, or one or more credit card companies within a card group or multiple card groups can have within the system structure. Similarly, a customer can affiliate with a single bank, a single credit card company, one or more banks within a bank group or multiple bank groups, one or more credit card companies within a card group or multiple card groups, or any combinations thereof within the system structure. Also, a merchant can affiliate with a single bank, a single credit card company, one or more banks within a bank group or multiple bank groups, one or more credit card companies within a card group or multiple card groups.

A simple system for providing pseudo cash transactions in accordance with the preferred embodiment includes a pseudo cash dispenser, a pseudo cash data packet converter, a pseudo cash repository, means for generating a record and means for deactivation of the record, as described more fully hereinafter.

The pseudo cash dispenser dispenses a pseudo cash preliminary data packet or a pseudo cash unit in exchange for a fixed monetary value. A pseudo cash preliminary data packet is a string of characters, preferably eight or more. The characters, for convenience, are either letters of the alphabet or numerals, but other characters could also be used without departing from the spirit of the invention. The pseudo cash dispenser can dispense the pseudo cash preliminary data packet to the first entity by any suitable means. If the pseudo cash preliminary data packet is dispensed by an automated teller machine, the string of characters could be printed on a receipt in the same fashion that account balances and other information are commonly available to bank customers in the United States today by automatic teller machines. The pseudo cash preliminary data packet could also be dispensed over an electronic communication medium, such as the Internet or a telephone line.

The pseudo cash data packet converter can take on any of a variety of forms. In an especially preferred embodiment, the pseudo cash data packet converter is a computer program located in a computer. However, if the algorithm is simple enough, the pseudo cash unit could be generated by an individual having knowledge of all of the requisite input data, and the algorithm, needed to generate the pseudo cash unit.

The pseudo cash preliminary data packet is based upon a randomly generated number that can be generated by commonly available techniques already in existence. Instead of using a bit sequence of data, it is preferred that the pseudo cash preliminary data packet be converted to a sequence of characters, such as an alphanumeric sequence, which will be easier to use. It is presently contemplated that the pseudo cash preliminary data packet will have eight or more characters, but this is somewhat dependent upon encryption technology, and what level of possibilities is needed to ensure a secure system.

The user key and the user insertion key are also strings of characters, preferably numeric characters. It is presently contemplated that the user key will have at least four characters and, in an especially preferred embodiment, the user insertion key will be a string of numeric characters that has an identical number of characters as the user key, each of the characters of the user insertion key being unique as compared to the other characters of the string. In a very simple algorithm for the pseudo cash data packet converter, the pseudo cash data packet converter will insert each character of the user key into the pseudo cash preliminary data packet at a location which corresponds to a corresponding character of the user insertion key to generate the pseudo cash unit.

The pseudo cash repository maintains a record of the pseudo cash unit and the fixed monetary value associated with the pseudo cash unit and, in an especially preferred embodiment, can be either a computer or a network of computers that operates as the money source. If the pseudo cash repository relies upon a network of computers, the network can be dedicated or it can be connected by an encrypted two-way communication linkage. The pseudo cash repository must also have a means for generating the record from the pseudo cash preliminary data packet, the fixed monetary value, the user key and the user insertion key in response to an exchange of the preliminary data packet to the first entity for the fixed monetary value and means for deactivation of the record and exchanging the fixed monetary value for receipt of the pseudo cash unit. The nature of the record of the pseudo cash unit kept by the pseudo cash repository will depend upon the level of anonymity and traceability selected by the first entity. If total anonymity is desired, then the identity of the first entity cannot be determined from the record kept by the pseudo cash repository. If total anonymity is not required, then the identity of the first entity can be determined because the record associated with the pseudo cash unit kept by the pseudo cash repository will contain information relating to the identity of the first entity.

The means for generating a record of the pseudo cash unit and subsequently deactivating the record can be extremely varied. In terms of efficiency and speed of execution, use of one or more computers is preferred. If a pseudo cash unit is being generated for a known entity, once the request is received and the entity is identified, the pseudo cash repository can check its records for the user key and the user insertion key of the known identity while also transferring the fixed monetary value from a monetary account associated with the first entity account file to the pseudo cash repository. Next, the pseudo cash repository can generate the pseudo cash unit and create a record that is uniquely identified with the pseudo cash unit which also contains the fixed monetary value associated with the pseudo cash unit. In its simplest form, the identity of the record could be the pseudo cash unit. In connection with that record, other information could be stored, such as the identity of the individual requesting the pseudo cash unit. If the pseudo cash unit is being generated for an unknown entity, the unknown entity could enter its user key and user insertion key into the system through any suitable means, such as, for example, an automated teller machine. After the record of the pseudo cash unit and its fixed monetary value is generated, it can be stored in a data base containing other pseudo cash records. When a pseudo cash unit is transmitted to the pseudo cash repository for redemption of its monetary value by a redeeming party, the data base containing pseudo cash records is searched for an active record corresponding to the pseudo cash unit. If an active record is found, the record is deactivated and the fixed monetary value associated with the pseudo cash unit is identified and then credited or turned over to the redeeming party. When an active record is deactivated, the record can be reconfigured, or a new, second record can be generated, which includes information such as the identity of the redeeming party, and if the transaction does not involve an anonymous pseudo cash unit, the identity of the first entity. The details of how records should be generated and deactivated should be well known within the skill of one of ordinary skill in the art of computer programing once the inventive concept of this application is made known to such a person.

To better describe the operation of a system of the preferred embodiment, and the method by which operates, the system and method will be described in greater detail in connection with FIGS. 1–3. In each of these Figures, the system is designed for providing pseudo cash transactions between a first entity and a second entity through use of a pseudo cash repository and the Internet. Also, like elements are described by like numbers in the Figures.

FIG. 1 depicts a system and method for providing totally anonymous pseudo cash transactions on the Internet. A first entity 1 obtains a pseudo cash unit 2 from a pseudo cash repository which is generally depicted as 3. In this system and method, the first entity 1 asks the pseudo cash repository 3 for a pseudo cash unit 2 with a fixed monetary value 4 and then transfers the fixed monetary value 4 to the pseudo cash repository 3 through the use of pseudo cash dispenser 5 which then gives the first entity 1 the pseudo cash unit 2.

Within the pseudo cash repository 3, the pseudo cash unit 2 is generated by a pseudo cash preliminary data packet converter 6 by use of a pseudo cash preliminary data packet 7, a user key 8 and a user insertion key 9. The pseudo cash preliminary data packet 7 can be retrieved from a file (not shown) of such numbers while the user key 8 and the user insertion key 9 can be generated by any suitable means, such as a computer program. Once the pseudo cash unit 2 is generated, a record generation means 10 generates an active record 12 associated with the pseudo cash unit 2 and the fixed monetary value 4 and stores the active record 12 in records storage medium 13, which is preferably some type of electronic data storage device.

In order to spend the pseudo cash unit 2 via the Internet 14, the first entity need only transfer the pseudo cash unit 2 to a merchant or vendor (not shown). Once the pseudo cash unit 2 has been transferred via the Internet 14, the pseudo cash unit 2 can be redeemed by sending the pseudo cash unit 2 to the pseudo cash repository 3 by any suitable means, such as an electronic communications medium (not shown). When the pseudo cash unit 2 is received by the pseudo cash repository 3 (the means for receiving the pseudo cash unit 2 is not shown), it is sent to a deactivation means 11 which checks the records storage medium 13 to determine if there is an active record associated with the pseudo cash unit 2. If an active record is located, the record is deactivated by deactivation means 11.

Figure 2:
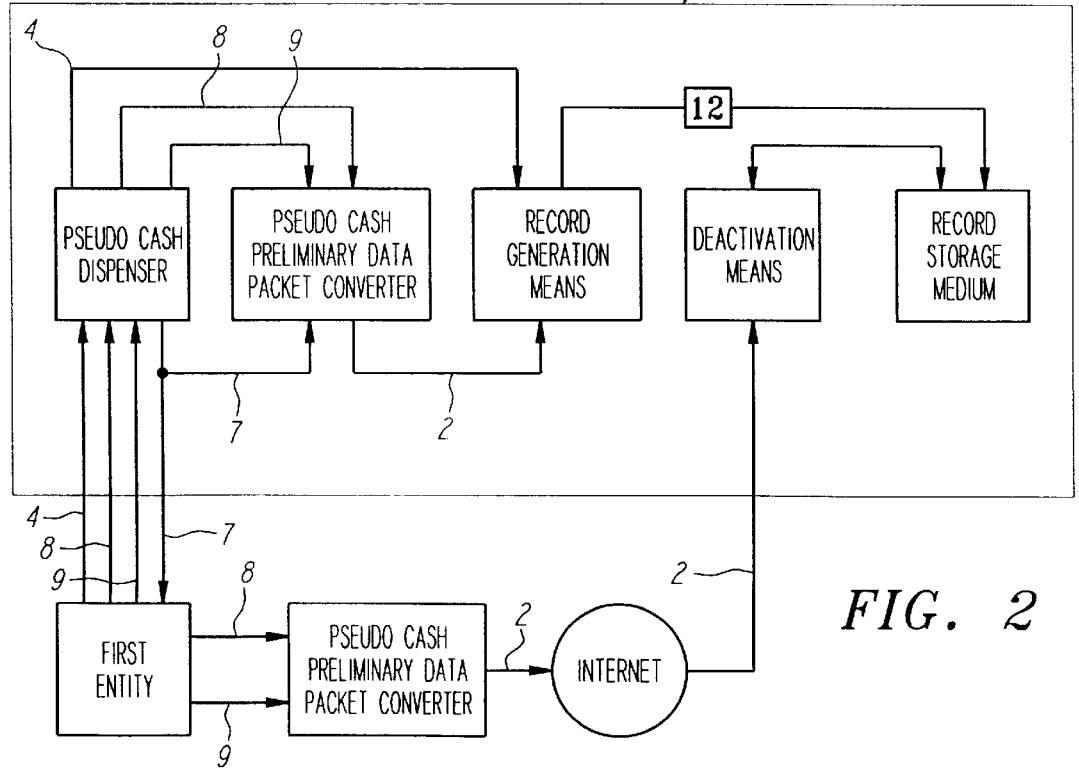
FIG. 2 is a schematic drawing depicting a system and method for providing totally anonymous pseudo cash transaction on the Internet which includes additional protection for the anonymous user.

FIG. 2 depicts a system and method for providing totally anonymous pseudo cash transactions on the Internet which is similar to FIG. 1 except that it includes additional security for the first entity. In this system and method, the first entity 1 provides the user key 8 and the user insertion key 9, along with the fixed monetary value 4, to the pseudo cash repository 3 and receives the pseudo cash preliminary data packet 7 from the pseudo cash repository 3 by the pseudo cash dispenser 5. When the first entity 1 wishes to spend the pseudo cash preliminary data packet 7, the first entity 1 uses the pseudo cash preliminary data packet converter 6 to generate the pseudo cash unit 2. FIG. 2 also depicts a pseudo cash preliminary data packet converter within the pseudo cash repository 3. Although not shown, the function of generating the pseudo cash unit 2 can be included within the record generation means 10. The pseudo cash preliminary data packet converter 6 uses the pseudo cash preliminary data packet 7, the user key 8 and the user insertion key 9 to generate the pseudo cash unit 2 which is then used by record generation means 10 to generate an active record 12 associated with pseudo cash unit 2 and the fixed monetary value 4.

Figure 3:
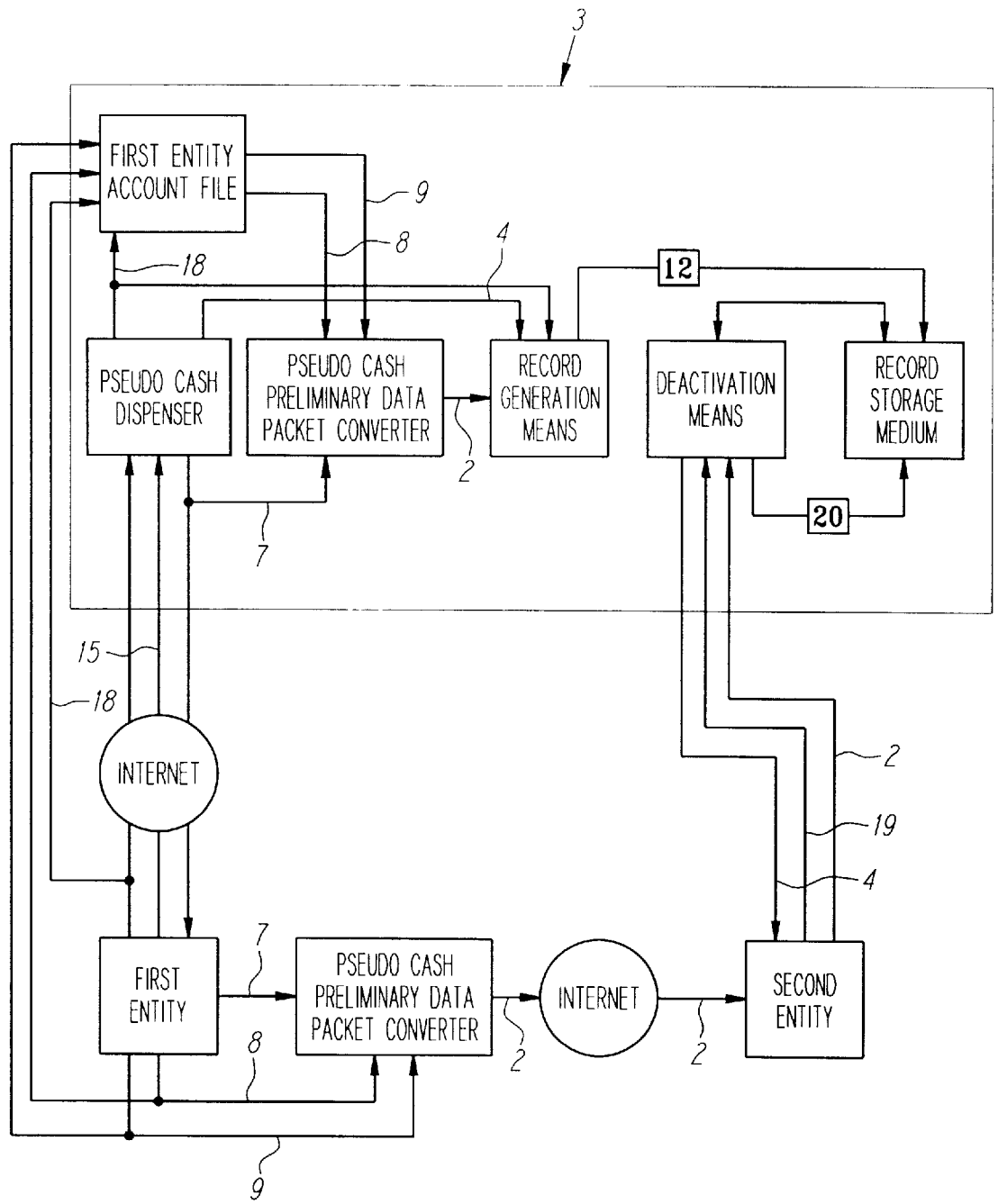
FIG. 3 is a schematic drawing depicting a system and method for providing pseudo cash transactions on the Internet that can only be traced through the pseudo cash repository.

FIG. 3 depicts a system and method for providing pseudo cash transactions on the Internet 14 that can only be traced through the pseudo cash repository 3. In this system and method, the first entity 1 must first establish a business relationship with the pseudo cash repository 3. Once this relationship is established, a first entity account file 17 is maintained by the pseudo cash repository 3 which includes the identity 18, the user key 8 and the user insertion key 9 of the first entity 1. When the first entity 1 requests pseudo cash from the pseudo cash repository 3, the first entity need only convey the request 15, along with the first entity's identity 18, to receive the pseudo cash preliminary data packet 7 from the pseudo cash dispenser 5 of the pseudo cash repository 3 through Internet 14. The pseudo cash repository 3 can then use the user key 8 and the user insertion key 9 contained in first entity account file 17, along with the pseudo cash preliminary data packet 7, to generate the pseudo cash unit 2 by means of a pseudo cash preliminary data packet converter 6. Thereafter, record generation means 10 generates an active record 12 associated with the pseudo cash unit 2 and the fixed monetary value contained in the request 15.

FIG. 3 also specifically identifies a second entity 16 which receives the pseudo cash unit 2 from the first entity 1 via the Internet 14. To redeem the pseudo cash unit 2, the second entity 16 sends the pseudo cash unit 2 and its identity 19 to the pseudo cash repository 3 where it is sent to deactivation means 11. Once the pseudo cash repository 3 has verified that the pseudo cash unit 2 is valid, the active record 12 associated with the pseudo cash unit 2 is deactivated by deactivation means 11 and the fixed monetary value 4 associated with the pseudo cash unit 2 is transferred from the pseudo cash repository 3 to the second entity 16. If desired, the deactivation means 11 can create a record 20 of the transaction which can be stored in records storage medium 13 or a separate storage medium (not shown).

Further details of the systems and methods of the preferred embodiment will now be described. For ease of description, it will be assumed that the pseudo cash repository is a bank.

With reference to FIG. 3, the bank obtains the usual personal information from the customer and establishes a certain amount of credit for the customer according to the customer's personal financial condition. According to the present system, the bank will also issue the customer an account number, a user key and a user insertion key. Because the user key is similar to the concept of a personal identification number (PIN) presently in common use, the user key will hereinafter be referred to as PIN and the user insertion key will hereinafter be referred to as a PIN insertion sequence number (PISN). The customer may also pick his or her own PIN and PISN so that the customer can remember these numbers and use them without having to look them up. There is no difference in the use of the PIN number between the current banking practice and the present system. Normally the customer uses this PIN to obtain cash from his or her bank account at ATMs and for other private financial transactions with the bank. The present system has similar ideas.

The PIN insertion sequence number or PISN on the other hand is a distinct feature of the present Internet cash dispensing system. Together with the PIN, these two numbers constitute the private "Key" to the customer's bank account in the system. Whereas the PIN is typically a 4 or 5 character numeric number in ordinary bank usage, in the current system, the PIN can be any number of alpha-numeric digits, preferably not less than four (4).

For a very simple system, the PISN number is a little bit more restricted. First, the number of characters in PISN should preferably be the same as the total number of alpha-numeric digits in the PIN. Second, because of its function (see below), no two characters in the PISN should be the same, unless the algorithm used to generate a pseudo cash unit is designed to account for such a possibility. For example, '2236', '4440', '5588' would all be invalid PISN numbers unless the algorithm accounts for duplicate numbers, such as converting a duplicate number to a new number in accordance with a predetermined parameter. As its name implies, PISN instructs the user how to insert his or her PIN number into a particular pseudo cash preliminary data packet, which, for example, might be an eight-character alpha-numeric number.

An example of how to use a customer's private "Key" or PIN and PISN numbers together to convert a pseudo cash preliminary data packet into a pseudo cash unit follows in which the algorithm is a simple substitution algorithm in which the PISN characters are used to denote a specific insertion location. In this example, let the PIN be 'Z123', PISN be '0246' and the pseudo cash preliminary data packet be 'ABCD1234'. Since the PIN is supposed to be inserted into the pseudo cash preliminary data packet according to the PISN insertion sequence, the pseudo cash unit will have a total of twelve (12) alpha-numeric characters, namely 8 from the pseudo cash preliminary data packet plus 4 from the PIN. Furthermore, the sequence of the pseudo cash unit is labeled from the 0th position to the 11th position, a total of 12 positions consistent with having 12 characters.

The first character of the PISN '0' means to start the first character of the PIN, namely 'Z' in the very first or 0th position of the pseudo cash unit. Similarly the second character of the PIN, namely '1' should occupy the second position and so on. The result of the pseudo cash unit is then 'ZA1B2C3D1234'. One can see that the PIN number has been inserted into the pseudo cash preliminary data packet according to the insertion sequence of PISN.

The pseudo cash preliminary data packet is an alphanumeric sequence of characters. In the example above, the pseudo cash preliminary data packet has eight (8) characters. In the present system, the pseudo cash unit is used as a way to represent Internet cash, or cash that is negotiable for buy-sell on the Internet. In the example above, the pseudo cash unit has a total of 12 characters, namely, 'ZA1B2C3D1234'. In the current system, the pseudo cash preliminary data packet has eight (8) characters for a specific purpose. Since we are taking advantage of the already existing PIN number, which has four (4) numeric characters, the pseudo cash unit or Internet cash for the present system will have twelve (12) characters, eight of whom are alphanumeric and the other four are numeric. As an encrypted code the security is equivalent to $1:36^8 \times 10^4$ or $2.82 \times 10^{16}$. For even higher security, the pseudo cash preliminary data packet can have more than 8 digits or the PIN can be changed to have four (4) alpha-numeric instead of four (4) numeric only characters. For example, if the pseudo cash preliminary data packet is changed to have 10 characters, then the security will be increased to $1:36^{10} \times 10^4$ or $3.65 \times 10^{19}$. On the other hand, if the pseudo cash preliminary data packet remains at 8 characters and the PIN changes to alpha-numeric characters, then the security will be increased to $1:36^{12}$ or $4.73 \times 10^{18}$. It is also possible to extend the security level by using upper and lower case alphabetical characters, as well as characters other than alpha-numeric characters. For example, other common characters found in typewriter keyboards, such as !, @, #, $, %, ^, &, *, (, ), _, -, ?, <, >, ?, ?, [, ], {, }, and \, could also be used. And, of course, the system is capable of being adapted to other language systems that use characters other than the Arabic alphabet.

Although one can clearly see the simplistic advantage of using the PIN as the starting point and the introduction of the PISN to form the system "Key", the present invention is not limited to such a selection. As a matter of fact, any methodology used in the formulation of the "Key" will work in the system but it might be more complicated from the overall system standpoint. A customer, armed with his or her private system "Key" from the money source with whom the customer has a valid account, is ready to do Internet business using the presently invented cash dispensing system for the Internet.

There are two categories of Internet cash identified by the current cash dispensing system according to their level of anonymity. Category I (Cat I) cash refers to pseudo cash units created by the system that absolutely cannot be traced. Category II (Cat II) cash refers to pseudo cash units created by the system that can only be traced through the bank of origin, or the nerve center. Consequently, Internet cash generated and used in the current system can generally be considered anonymous. Furthermore, for this reason a special name has been chosen for the presently invented cash dispensing system for the Internet. It is called System for Processing Electronic Cash Transactions Anonymously or the SPECTA system.

Referring again to FIG. 1, a person can walk into a bank and use real cash to purchase Category I cash from the bank using the SPECTA system. In this case the bank simply issues the person the Cat I cash in exchange for real cash. Example: A person wishes to purchase $200 Internet Cat I cash in the following denominations:

| | |
|---|---|
| $100 | One (1) |
| $20 | Five (5) |

The bank issues the person the following Cat I Internet cash as follows:

| | |
|---|---|
| 1289GTK8DE66 | $100 |
| 4567ABGH4578 | $20 |
| 4567ABIKL36Z | $20 |
| 4567ABCK7890 | $20 |
| 4567ABCF8999 | $20 |
| 499034KLL456 | $20 |

Needless to say, as the bank issues these Cat I Internet cash, it only keeps track of what Cat I cash or codes have been issued without having to inquire about the purchaser's personal information or references. In essence, this is just a cash transaction. Thus, these Cat I cash are just like real cash and any person who has access to these Cat I codes will in fact be the owner of these cash. If these Cat I cash are lost or misplaced, or the codes are revealed to a stranger, then it is like losing the cash and the original purchaser might never be able to recover these Internet negotiable cash.

From the System standpoint, as these Cat I cash are issued, the bank will immediately create a record of these Cat I codes with their associated monetary value. Note that these Cat I codes (or "keyed" Cat II codes, see below) are stored for verification purposes only and they are not available for inspection or revelation to anybody. Thus the purchaser can indeed spend these Cat I cash on the Internet as negotiable cash without any restriction except that the merchants have to be affiliated with the same money source from which the Internet cash was purchased. The purchaser can in fact purchase Cat I cash from the bank in any amount with real cash if the customer knows ahead of time exactly how much Internet cash the customer will need, for example like $125.78.

Now referring to FIGS. 1 and 3, a person can walk in and purchase Cat I cash from the bank using a bank account or credit instead of real cash. The bank can issue the customer the same Cat I cash codes as before without having to link the customer in any way to these Internet cash.

The customer can also use the customer's bank account or credit to purchase Cat II cash. Since the bank knows and can use the customer's private "Key" at the bank, the Cat II cash can be issued to the customer on site in a simpler form, as pseudo cash preliminary data packets, as follows (same example of $200 as before):

| | |
|---|---|
| 128PYU34 | $100 |
| 4567DFGT | $20 |
| THU4567S | $20 |
| 789JKIUP | $20 |
| 56790TYY | $20 |
| TYRE5647 | $20 |

Furthermore, the customer can even have the bank send these Cat II codes to the customer's email address on the Internet without risking anything. (In this latter case, the customer might just as well use a regular phone to call up the bank instead of showing up at it to do the transaction.) Note that the Cat II codes only contain eight (8) alpha-numeric characters instead of 12 like the Cat I cash or codes. By giving up absolute anonymity, Cat II cash is much more secured. It is because the Cat II codes themselves are not negotiable on the Internet as they are issued. The purchaser in this case must "key" these Cat II codes using his or her personal "Key" (see example given earlier) in order to turn them into 12-character Cat II Internet cash. Since the customer's "Key" is private and the customer does not have to "key" the Cat II codes to convert them into Cat II cash until the very last minute when the customer needs the cash on the Net, the customer can treat these Cat II codes with much less care. But the bank knows the customer's "Key" and it must convert the Cat II codes into Cat II cash to create an active record 12 for each Cat II code. Thus even if these Cat II codes are lost or misplaced, nobody can take advantage of them and the purchaser can retrieve them from the bank with information linking to the customer's bank or credit card account.

The SPECTA system does not specify the nature and characteristics of the encrypted communication link between the money source and its affiliated merchants or bank members. Such communication links can vary all the way from digital phone lines like the Integrated Services Digital Network (ISDN), digital cellular radio network using advanced satellite systems, or even the Internet network itself. At the same time the encryption method could use any on-the-fly encryption technology ranging from 64- to 128 bit or any future enhancement implementation. The purpose for not specifying the exact nature and characteristics of the encrypted link for the system is to allow for future technological advancement in this area without any impact to the systems's operation. Thus, it is up to the nerve centers of this system to take advantage of any performance enhancement and cost reduction in this area in order to minimize the overall system transaction costs.

It is also up to the nerve centers to arrange for the transfer of money to the second entities or merchants who redeem pseudo cash units. In this regard, it is probably desirable that such transactions be delayed a certain time period to insure that a pseudo cash unit has not been illicitly intercepted on the Internet. Thus, for example, if monies are not immediately transferred to second entities, then receipt of duplicate pseudo cash units from two different entities could trigger an investigation into fraud before either of the entities receives any money from the nerve centers.

Referring to FIG. 3, a person with an email address on the Internet can purchase Cat II cash from the money source using the Internet alone. The only requirement is that the person has to "key" his or her bank or credit account number with his or her private "Key" before forwarding it to the bank's email address with any messages or requests. Like before, the bank will email the customer the Cat II codes and make activate a record of Cat II cash. Everything is exactly the same as in the previously illustrated examples.

To make keying the Cat II codes into Cat II cash easier and simpler, it is relatively straightforward to program one's own "macro" software to perform this relatively tedious task. The macro software will take the "Key" or PIN and PISN 'passwords' from the user and can easily convert a Cat II pseudo cash preliminary data packet into Cat II cash, i.e. from an eight (8) alpha-numeric digits number into a twelve (12) digits number. The content of the Cat II cash depends upon whether or not the PIN is strictly an all numeric number or alpha-numeric.

The SPECTA system overcomes many of the shortcomings of presently available electronic money/Internet payment systems. Its system structure correctly centers around the money source and leaves the actual buy-sell transactions to the Internet where it excels with ease, speed and convenience. It elegantly adapts the system's customer/money source interface to existing practices in the banking and credit industry thereby streamlining many system procedures and making them extremely user-friendly. The end result is the advent of a new cash dispensing system fully compatible in performance with and takes full advantage of the Internet. The system as presently devised is fully auditable and secured. If desired, transactions within the system can be tailored to have absolute anonymity. Even ordinary transactions are automatically rendered very private. Furthermore, the system can grow with the advancements of future digital communication and encryption technologies.

The cash dispensing system for the Internet according to the present invention is simple and convenient to use for all users. At the same time the system is fully secured (i.e. no accidental loss of money due to computer hardware or software failures) and auditable. Furthermore, the system can grow with time and its structure can easily be expanded to accommodate any technological advances in the fast lanes of our Information Superhighway. The transaction cost is also reduced to a minimum by 1) limiting the use of encryption as much as possible; 2) taking full advantage of the rapidly advancing digital telecommunication technologies such as Integrated Services Digital Network (ISDN) and digital cellular wireless network for Personal Communication Services (PCS); 3) sharing costs with existing services offered by the money center; 4) making the merchants share the transaction costs much like the present credit cards situation; and 5) making also the users do the bulk of the work to obtain their cash and only when they need to.

In operation a customer establishes an account and credit with a money source and obtains from it a personal "Key". To obtain Internet cash, the customer makes a request to the money source either in person, by phone or via the Net email. For completely unidentifiable Internet cash, the customer uses cash to purchase and obtain Category I (Cat I) cash or codes directly from the money source or has the latter send him Cat I cash or codes via the encrypted link. Customer acknowledges receipt of these codes or cash via email on the Internet. For ordinary Internet cash, namely identifiable or traceable, the money source sends the customer Category II (Cat II) codes via the Internet email. Cat I codes or cash liken to real cash and are good on the Internet for commerce without further identification. On the other hand, the customer has to personally "key" Cat II codes with a personal "Key" from the money source to turn them into Cat II cash before they become valid cash for commerce on the Internet.

The above discussion of this invention is directed primarily to the preferred embodiments and practices thereof. Further modifications are also possible without departing from the inventive concept. Thus, for example, the algorithm used to generate the pseudo cash unit could also insert an additional string of characters into the pseudo cash preliminary data packet. This string could be used for additional security, or for other purposes, such as providing data. For instance, the string could be used to identify the entity that originally generated the pseudo cash unit, when the pseudo cash unit was generated, etc. Also, the algorithm could be periodically changed for additional security provided there is a suitable means to update the algorithm used by the first entity and then reconfigure the records maintained by the pseudo cash repository to account for the changed algorithm. In addition, the system can be designed to take into account the possibility that two pseudo cash units might be generated that are identical. To avoid this problem, the system could check the database of existing active records of pseudo cash units to prevent duplication prior to issuance of a preliminary data packet or pseudo cash unit to a first entity. If duplication is detected, one or more additional preliminary data packets could be used to generate a unique pseudo cash unit that is not active.

Accordingly, it will be readily apparent to those skilled in the art that still further changes and modifications in the actual implementation of the concepts described herein can readily be made without departing from the spirit and scope of the invention as defined by the following claims.

We claim:

1. A system for providing pseudo cash transactions, comprising:

a pseudo cash dispenser for dispensing a pseudo cash preliminary data packet in exchange for a fixed monetary value;

a pseudo cash data packet converter for inserting a user key into the pseudo cash preliminary data packet through the use of a user insertion key to generate a pseudo cash unit;

a pseudo cash repository for maintaining a record of the pseudo cash unit and the fixed monetary value;

means for generating the record from the pseudo cash preliminary data packet, the fixed monetary value, the user key and the user insertion key in response to an exchange of the preliminary data packet to a first entity for the fixed monetary value; and means for deactivation of the record and exchanging the fixed monetary value for receipt of the pseudo cash unit.

2. A system as recited in claim 1, wherein the pseudo cash dispenser dispenses the pseudo cash preliminary data packet to the first entity.

3. A system as recited in claim 2, wherein the pseudo cash preliminary data packet is dispensed by an automated teller machine.

4. A system as recited in claim 2, wherein the pseudo cash preliminary data packet is dispensed to the first entity over an electronic communication medium.

5. A system as recited in claim 1, wherein the pseudo cash preliminary data packet is a string of at least eight characters.

6. A system as recited in claim 1, wherein the user key is a second string of at least four characters.

7. A system as recited in claim 6, wherein the user insertion key is a third string of numeric characters that has an identical number of characters as the second string, each of the numeric characters of the third string being unique as compared to the other numeric characters of the third string.

8. A system as recited in claim 7, wherein the pseudo cash data packet converter inserts each character of the second string into the pseudo cash preliminary data packet at a location which corresponds to a corresponding numeric character of the third string to generate the pseudo cash unit.

9. A system as recited in claim 1, wherein the pseudo cash data packet converter is a computer program located in a computer.

10. A system for providing pseudo cash transactions between a first entity and a second entity via the Internet, comprising:

a pseudo cash dispenser for dispensing a pseudo cash preliminary data packet with a fixed monetary value to the first entity in a readable format;

a pseudo cash data packet converter for inserting a user key of the first entity into the pseudo cash preliminary data packet through the use of a user insertion key of the first entity to generate a pseudo cash unit;

a pseudo cash repository for maintaining a file associated with the pseudo cash unit and the fixed monetary value;

means for generating the file;

a first entity link to the Internet;

a second entity link to the Internet;

means for transferring the pseudo cash unit from the first entity link to the second entity link via the Internet;

a communication link between the second entity and the pseudo cash repository; and means to deactivate the file and transfer the fixed monetary value from the pseudo cash repository to the second entity in response to transmission of the pseudo cash unit from the second entity to the pseudo cash repository via the communication link.

11. A system as recited in claim 10, further comprising:

means for transmitting the pseudo cash preliminary data packet from the pseudo cash dispenser to first entity link via the Internet.

12. A system as recited in claim 10, wherein the communication link is an electronic link via the Internet.

13. A system as recited in claim 10, wherein the pseudo cash preliminary data packet is a string of at least eight characters, the user key is a second string of at least four characters, and the user insertion key is a third string of numeric characters that has an identical number of characters as the second string, each of the numeric characters of the third string being unique as compared to the other numeric characters of the third string.

14. A system as recited in claim 10, wherein the file contains means for identifying the first entity.

15. A method for providing pseudo cash transactions, comprising:

generating a pseudo cash preliminary data packet;

generating a pseudo cash unit from the pseudo cash preliminary data packet by inserting a user key of a first entity into the pseudo cash preliminary data packet in accordance with a user insertion key of the first entity;

assigning a fixed monetary value to the pseudo cash unit;

dispensing the pseudo cash preliminary data packet from a pseudo cash dispenser to the first entity in exchange for the fixed monetary value received from the first entity;

regenerating the pseudo cash unit from the pseudo cash preliminary data packet by inserting the user key of the first entity into the pseudo cash preliminary data packet in accordance with the user insertion key of the first entity; and exchanging the pseudo cash unit for the fixed monetary value.

16. A method as recited in claim 15, comprising the additional steps of:

creating a file in a pseudo cash repository which contains the pseudo cash unit and the fixed monetary value;

deleting the file in the pseudo cash repository when the pseudo cash unit is exchanged for the fixed monetary value.

17. A method as recited in claim 15, wherein the pseudo cash unit is generated by the first entity.

18. A method as recited in claim 15, wherein the pseudo cash unit is generated by a money repository for the first entity by use of the user key and the user insertion key of the first entity.

19. A method as recited in claim 18, comprising the addition steps of:

creating a file in a pseudo cash repository which contains the pseudo cash unit, the fixed monetary value and means for identifying the first entity;

deleting the file in the pseudo cash repository when the pseudo cash unit is exchanged for the fixed monetary value.

20. A method as recited in claim 19, comprising the additional step of:

maintaining a record of the exchange of the pseudo cash unit for the fixed monetary value that includes means for identifying the first entity and the identity of who exchanges the pseudo cash unit for the fixed monetary value.

21. A method as recited in claim 15, wherein the pseudo cash preliminary data packet is dispensed to the first entity by electronic means.

22. A method for providing pseudo cash transactions between a first entity and a second entity through use of a pseudo cash repository, comprising the steps of:

generating a pseudo cash preliminary data packet in the pseudo cash repository;

generating a pseudo cash unit in the pseudo cash repository from the pseudo cash preliminary data packet, a user key of the first entity and a user insertion key of the first entity by inserting the user key of the first entity into the pseudo cash preliminary data packet in accordance with an algorithm that uses the user insertion key of the first entity;

assigning a fixed monetary value to the pseudo cash unit by the pseudo cash repository;

generating a record of the pseudo cash unit and the fixed monetary value in the pseudo cash repository which is activated by transferring the fixed monetary value from the first entity to the pseudo cash repository and which remains active until it is deactivated by the pseudo cash repository;

dispensing the pseudo cash preliminary data packet from a pseudo cash dispenser to the first entity;

generating the pseudo cash unit from a pseudo cash data packet converter by inserting the user key of the first entity into the pseudo cash preliminary data packet in accordance with the algorithm that uses the user insertion key of the first entity;

transmitting the pseudo cash unit from the second entity to the pseudo cash repository;

verifying that the pseudo cash unit matches the record of the pseudo cash unit which is still active;

deactivating the record of the pseudo cash unit; and transferring the fixed monetary value from the pseudo cash repository to the second entity.

23. A method as recited in claim 22, wherein the pseudo cash unit is generated by the pseudo cash repository by use of the user key and the user insertion key of the first entity which are stored in a first entity account file of the pseudo cash repository associated with the first entity.

24. A method as recited in claim 23, wherein the record of the pseudo cash unit includes means for identifying the first entity.

25. A method as recited in claim 24, wherein the fixed monetary value is transferred from the first entity to the pseudo cash repository by transferring the fixed monetary value from a monetary account associated with the first entity account file to the pseudo cash repository.

26. A method as recited in claim 25, wherein the pseudo cash preliminary data packet is dispensed to the first entity from a pseudo cash dispenser by an automated teller machine.

27. A method as recited in claim 25, wherein the pseudo cash preliminary data packet is dispensed to the first entity from a pseudo cash dispenser over an electronic communication medium.

28. A method as recited in claim 22, wherein the fixed monetary value is assigned to the pseudo cash unit as a result of a communication between the first entity and the pseudo cash repository.

29. A method as recited in claim 22, wherein the pseudo cash preliminary data packet is a string of at least eight characters.

30. A method as recited in claim 29, wherein the user key is a second string of at least four characters.

31. A method as recited in claim 30, wherein the user insertion key is a third string of numeric characters that has an identical number of characters as the second string, each of the numeric characters of the third string being unique as compared to the other numeric characters of the third string.

32. A method as recited in claim 22, wherein the pseudo cash data packet converter is a computer program located in a computer.

33. A method as recited in claim 32, wherein the algorithm is periodically revised.

34. A method as recited in claim 32, wherein the algorithm also inserts a fourth string of characters into the pseudo cash preliminary data packet.

35. A method as recited in claim 34, wherein the fourth string of characters identifies the pseudo cash repository.

36. A method as recited in claim 22, wherein the first entity and the second entity are the same.

37. A method as recited in claim 22, wherein the pseudo cash unit is transferred from the second entity to the pseudo cash repository over an electronic communication medium.

38. A method as recited in claim 22, wherein the pseudo cash unit is generated in the pseudo cash repository by the first entity.

39. A method for providing pseudo cash transactions, comprising:
    generating a pseudo cash preliminary data packet;
    generating a pseudo cash unit from the pseudo cash preliminary data packet by inserting a user key of a first entity into the pseudo cash preliminary data packet in accordance with a user insertion key of the first entity;
    assigning a fixed monetary value to the pseudo cash unit;
    dispensing the pseudo cash preliminary data packet from a pseudo cash dispenser to the first entity in exchange for the fixed monetary value received from the first entity;
    regenerating the pseudo cash unit from the pseudo cash preliminary data packet by inserting the user key of the first entity into the pseudo cash preliminary data packet in accordance with the user insertion key of the first entity; and
    exchanging the pseudo cash unit for the fixed monetary value;
    wherein the pseudo cash preliminary data packet is dispensed to the first entity more than once.

40. A method as recited in claim 39, comprising the additional steps of:
    creating a file in a pseudo cash repository which contains the pseudo cash unit and the fixed monetary value;
    deleting the file in the pseudo cash repository when the pseudo cash unit is exchanged for the fixed monetary value.

41. A method as recited in claim 39, wherein the pseudo cash unit is generated by the first entity.

42. A method as recited in claim 39, wherein the pseudo cash unit is generated by a money repository for the first entity by use of the user key and the user insertion key of the first entity.

43. A method as recited in claim 42, comprising the addition steps of:
    creating a file in a pseudo cash repository which contains the pseudo cash unit, the fixed monetary value and means for identifying the first entity;
    deleting the file in the pseudo cash repository when the pseudo cash unit is exchanged for the fixed monetary value.

44. A method as recited in claim 43, comprising the additional step of:
    maintaining a record of the exchange of the pseudo cash unit for the fixed monetary value that includes means for identifying the first entity and the identity of who exchanges the pseudo cash unit for the fixed monetary value.

45. A method as recited in claim 39, wherein the pseudo cash preliminary data packet is dispensed to the first entity by electronic means.

46. A method for providing pseudo cash transactions between a first entity and a second entity through use of a pseudo cash repository, comprising the steps of:
    generating a pseudo cash preliminary data packet in the pseudo cash repository;
    generating a pseudo cash unit in the pseudo cash repository from the pseudo cash preliminary data packet, a user key of the first entity and a user insertion key of the first entity by inserting the user key of the first entity into the pseudo cash preliminary data packet in accordance with an algorithm that uses the user insertion key of the first entity;
    assigning a fixed monetary value to the pseudo cash unit by the pseudo cash repository;
    generating a record of the pseudo cash unit, the fixed monetary value and means for identifying the first entity in the pseudo cash repository which is activated by transferring the fixed monetary value from the first entity to the pseudo cash repository and which remains active until it is deactivated by the pseudo cash repository;
    dispensing the pseudo cash preliminary data packet from a pseudo cash dispenser to the first entity;
    dispensing the pseudo cash preliminary data packet from the pseudo cash repository to the first entity more than once;
    generating the pseudo cash unit from a pseudo cash data packet converter by inserting the user key of the first entity into the pseudo cash preliminary data packet in accordance with the algorithm that uses the user insertion key of the first entity;
    transmitting the pseudo cash unit from the second entity to the pseudo cash repository;
    verifying that the pseudo cash unit matches the record of the pseudo cash unit which is still active;
    deactivating the record of the pseudo cash unit; and
    transferring the fixed monetary value from the pseudo cash repository to the second entity.

47. A method as recited in claim 46, wherein the pseudo cash unit is generated by the pseudo cash repository by use of the user key and the user insertion key of the first entity which are stored in a first entity account file of the pseudo cash repository associated with the first entity.

48. A method as recited in claim 47, wherein the record of the pseudo cash unit includes means for identifying the first entity.

49. A method as recited in claim 48, wherein the fixed monetary value is transferred from the first entity to the pseudo cash repository by transferring the fixed monetary value from a monetary account associated with the first entity account file to the pseudo cash repository.

50. A method as recited in claim 49, wherein the pseudo cash preliminary data packet is dispensed to the first entity from a pseudo cash dispenser by an automated teller machine.

51. A method as recited in claim 49, wherein the pseudo cash preliminary data packet is dispensed to the first entity from a pseudo cash dispenser over an electronic communication medium.

52. A method as recited in claim 46, wherein the fixed monetary value is assigned to the pseudo cash unit as a result of a communication between the first entity and the pseudo cash repository.

53. A method as recited in claim 46, wherein the pseudo cash preliminary data packet is a string of at least eight characters.

54. A method as recited in claim 53, wherein the user key is a second string of at least four characters.

55. A method as recited in claim 54, wherein the user insertion key is a third string of numeric characters that has an identical number of characters as the second string, each of the numeric characters of the third string being unique as compared to the other numeric characters of the third string.

56. A method as recited in claim 46, wherein the pseudo cash data packet converter is a computer program located in a computer.

57. A method as recited in claim 56, wherein the algorithm is periodically revised.

58. A method as recited in claim 56, wherein the algorithm also inserts a fourth string of characters into the pseudo cash preliminary data packet.

59. A method as recited in claim 58, wherein the fourth string of characters identifies the pseudo cash repository.

60. A method as recited in claim 46, wherein the first entity and the second entity are the same.

61. A method as recited in claim 46, wherein the pseudo cash unit is transferred from the second entity to the pseudo cash repository over an electronic communication medium.

62. A method as recited in claim 61, further comprising:
maintaining a record of the transfer of the fixed monetary value from the pseudo cash repository to the second entity that includes means for identifying the first entity, the second entity and the fixed monetary value transferred from the pseudo cash repository to the second entity as a result of receipt of the pseudo cash unit.

63. A method as recited in claim 61, further comprising:
dispensing the pseudo cash preliminary data packet from the pseudo cash repository to the first entity more than once.

64. A method as recited in claim 61, further comprising the steps of:
searching for any active record maintained by the pseudo cash repository that is associated with the first entity; and
dispensing the pseudo cash preliminary data packet associated with any active record located by the search to the first entity.

65. A method as recited in claim 46, wherein the pseudo cash unit is generated in the pseudo cash repository by the first entity.

66. A method as recited in claim 65, wherein the record of the pseudo cash unit generated in the pseudo cash repository does not include means for identifying the first entity.

67. A method as recited in claim 66, wherein the record of the pseudo cash unit is deleted when it is deactivated.

68. A system for providing pseudo cash transactions, comprising:
a pseudo cash dispenser for dispensing a pseudo cash preliminary data packet in exchange for a fixed monetary value;
a pseudo cash data packet converter for inserting a user key into the pseudo cash preliminary data packet through the use of a user insertion key to generate a pseudo cash unit;
a pseudo cash repository for maintaining a record of the pseudo cash unit and the fixed monetary value;
means for generating the record from the pseudo cash preliminary data packet, the fixed monetary value, the user key and the user insertion key in response to an exchange of the preliminary data packet to a first entity for the fixed monetary value; and
means for deactivation of the record and exchanging the fixed monetary value for receipt of the pseudo cash unit;
wherein the record contains information relating to the identity of the first entity.

69. A system for providing pseudo cash transactions, comprising:
a pseudo cash dispenser for dispensing a pseudo cash preliminary data packet in exchange for a fixed monetary value;
a pseudo cash data packet converter for inserting a user key into the pseudo cash preliminary data packet through the use of a user insertion key to generate a pseudo cash unit;
a pseudo cash repository for maintaining a record of the pseudo cash unit and the fixed monetary value;
means for generating the record from the pseudo cash preliminary data packet, the fixed monetary value, the user key and the user insertion key in response to an exchange of the preliminary data packet to a first entity for the fixed monetary value; and
means for deactivation of the record and exchanging the fixed monetary value for receipt of the pseudo cash unit;
wherein the identity of the first entity can not be determined from the record.

70. A method for providing pseudo cash transactions between a first entity and a second entity through use of a pseudo cash repository, comprising the steps of:
generating a pseudo cash preliminary data packet in the pseudo cash repository;
generating a pseudo cash unit in the pseudo cash repository from the pseudo cash preliminary data packet, a user key of the first entity and a user insertion key of the first entity by inserting the user key of the first entity into the pseudo cash preliminary data packet in accordance with an algorithm that uses the user insertion key of the first entity;
assigning a fixed monetary value to the pseudo cash unit by the pseudo cash repository;

generating a record of the pseudo cash unit and the fixed monetary value in the pseudo cash repository which is activated by transferring the fixed monetary value from the first entity to the pseudo cash repository and which remains active until it is deactivated by the pseudo cash repository;

dispensing the pseudo cash preliminary data packet from a pseudo cash dispenser to the first entity;

generating the pseudo cash unit from a pseudo cash data packet converter by inserting the user key of the first entity into the pseudo cash preliminary data packet in accordance with the algorithm that uses the user insertion key of the first entity;

transmitting the pseudo cash unit from the second entity to the pseudo cash repository;

verifying that the pseudo cash unit matches the record of the pseudo cash unit which is still active;

deactivating the record of the pseudo cash unit; and transferring the fixed monetary value from the pseudo cash repository to the second entity wherein the pseudo cash unit is generated in the pseudo cash repository by the first entity; and wherein the record of the pseudo cash unit generated in the pseudo cash repository does not include means for identifying the first entity.

71. A method as recited in claim 70, wherein the record of the pseudo cash unit is deleted when it is deactivated.

* * * * *